(12) United States Patent
Nakai et al.

(10) Patent No.: US 8,717,445 B2
(45) Date of Patent: May 6, 2014

(54) IMAGE PICKUP APPARATUS AND FOCUSING MECHANISM CONTROL METHOD

(75) Inventors: Takehiro Nakai, Kawasaki (JP); Akifumi Izumisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/702,769

(22) Filed: Feb. 9, 2010

(65) Prior Publication Data

US 2010/0208088 A1 Aug. 19, 2010

(30) Foreign Application Priority Data

Feb. 13, 2009 (JP) ................... 2009-031151

(51) Int. Cl.
*H04N 5/228* (2006.01)
*H04N 5/232* (2006.01)
*G03B 13/00* (2006.01)

(52) U.S. Cl.
USPC ..................................... 348/208.16; 348/345

(58) Field of Classification Search
USPC ............... 348/208.14, 208.16, 208.12, 208.4, 348/208.2, 345
See application file for complete search history.

(56) References Cited

U.S. PATENT DOCUMENTS

| | | | | |
|---|---|---|---|---|
| 6,721,013 B1* | 4/2004 | Tsujino | ...................... | 348/345 |
| 2006/0176366 A1 | 8/2006 | Moriya | | |
| 2007/0122129 A1* | 5/2007 | Sakamoto et al. | ............... | 396/52 |
| 2008/0180536 A1* | 7/2008 | Nakahara | .................. | 348/208.99 |
| 2009/0174806 A1* | 7/2009 | Utagawa | ....................... | 348/345 |
| 2011/0234885 A1* | 9/2011 | Muramatsu | .................... | 348/345 |
| 2012/0013786 A1* | 1/2012 | Yasuda et al. | ................. | 348/349 |

FOREIGN PATENT DOCUMENTS

| | | |
|---|---|---|
| JP | 2003-244520 A | 8/2003 |
| JP | 2003-279839 A | 10/2003 |
| JP | 3473105 B2 | 12/2003 |
| JP | 2006-033023 A | 2/2006 |
| JP | 2006-203493 A | 8/2006 |
| JP | 2006-215393 A | 8/2006 |
| JP | 2006-337689 A | 12/2006 |
| JP | 2007-180990 A | 7/2007 |

OTHER PUBLICATIONS

Japanese Office Action dated Aug. 21, 2012, issued in corresponding application No. 2009-088234, w/ partial translation.

* cited by examiner

*Primary Examiner* — Tuan Ho
*Assistant Examiner* — Shahbaz Nazrul
(74) *Attorney, Agent, or Firm* — Westerman, Hattori, Daniels & Adrian, LLP

(57) ABSTRACT

An image pickup apparatus includes an imaging element for acquiring an image of a target object; a detector for detecting movement of the image pickup apparatus; and a controller for controlling focus of the imaging element on the target object while the movement of the image pickup apparatus detected by the detector is not more than a threshold degree.

29 Claims, 9 Drawing Sheets

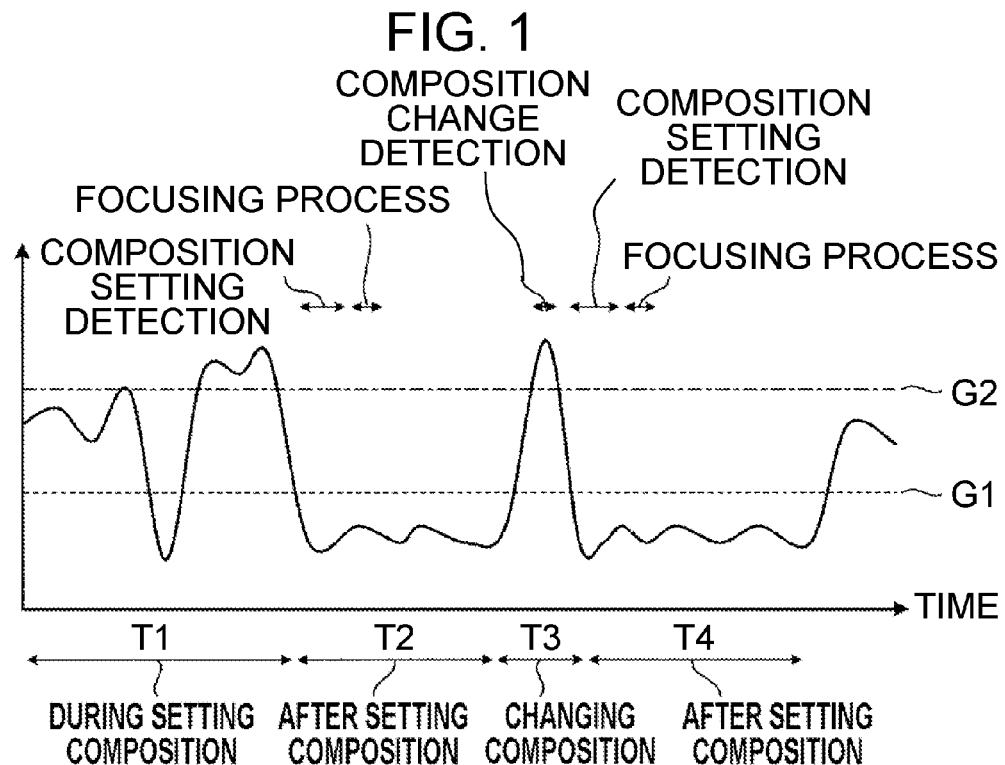
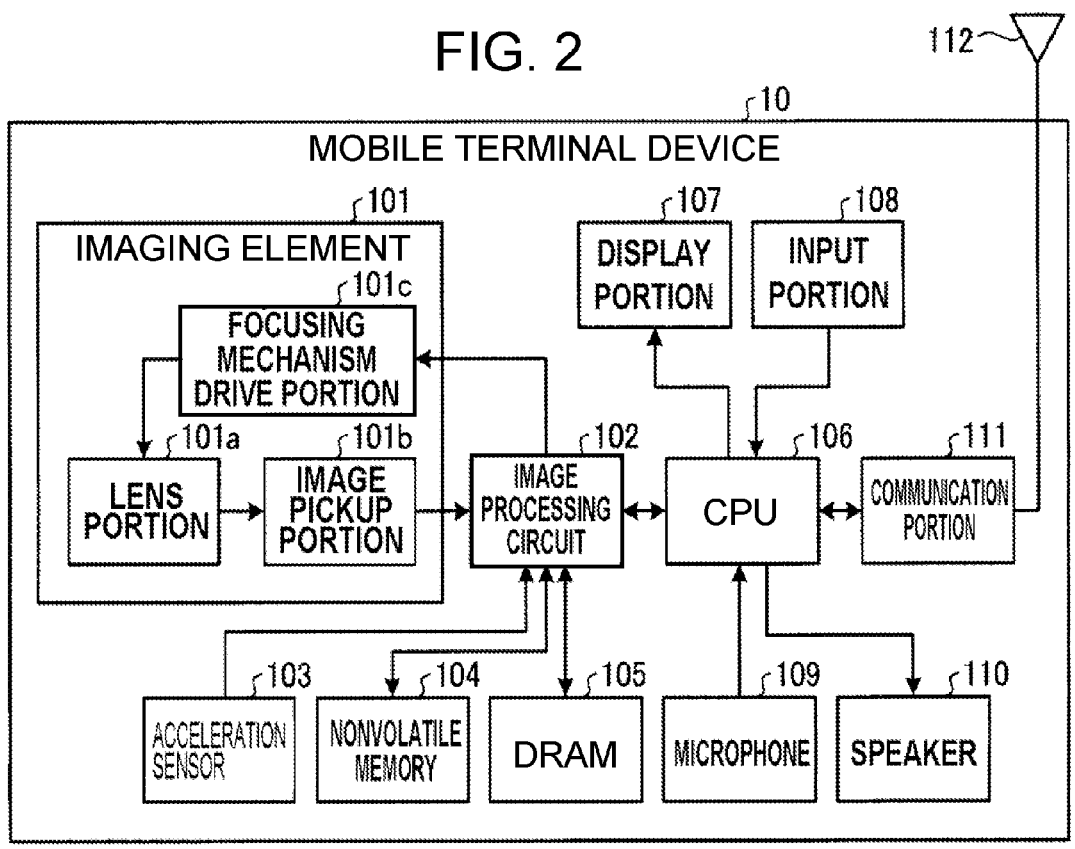

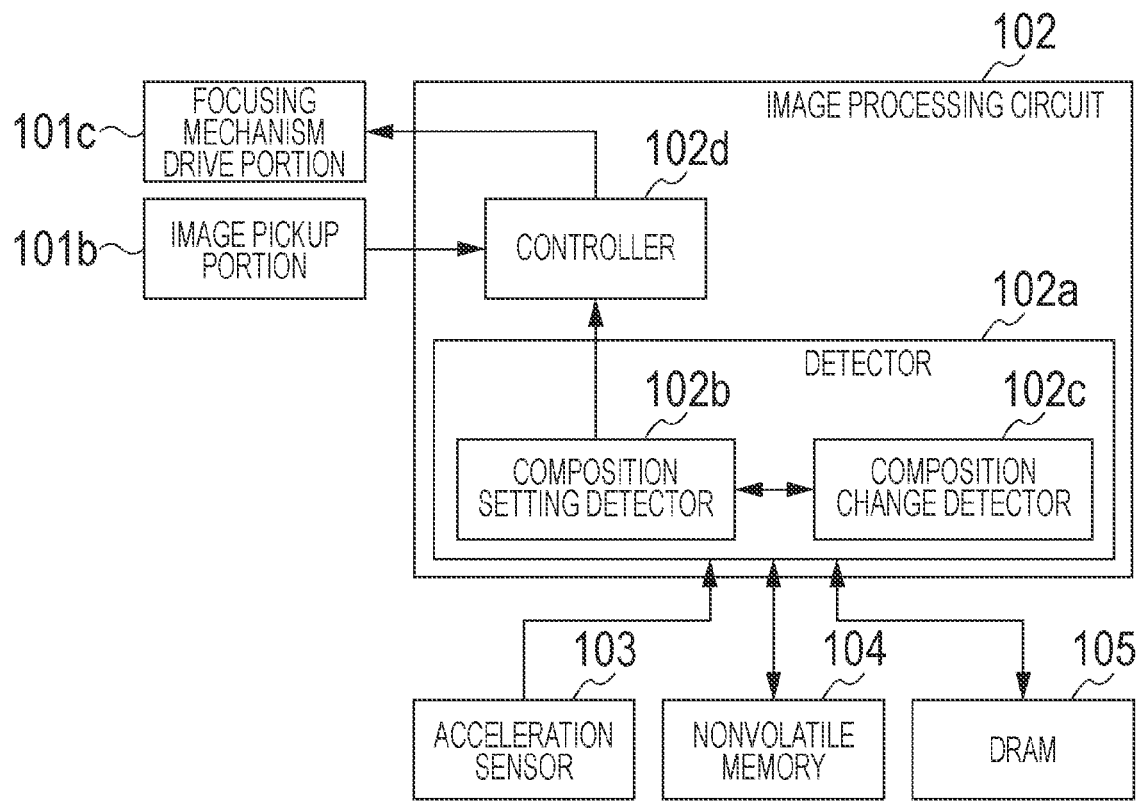

FIG. 9

| TYPE | ACCELERATION | PERIOD |
|---|---|---|
| AT-REST DETERMINATION | LESS THAN G1 | DETECTED C1 OR MORE TIMES IN SUCCESSION |
| IN-MOTION DETERMINATION A | NOT LESS THAN G2 | DETECTED C2 OR MORE TIMES IN SUCCESSION |
| IN-MOTION DETERMINATION B | NOT LESS THAN G3 | DETECTED C3 OR MORE TIMES IN SUCCESSION |

NOTE: G3 < G2 AND C3 > C2

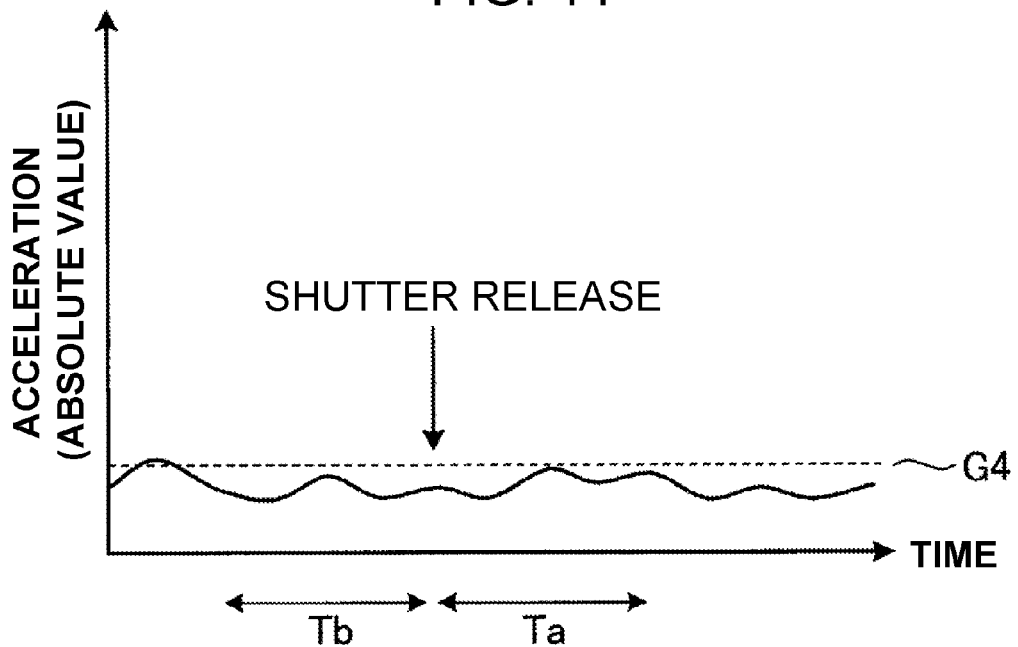
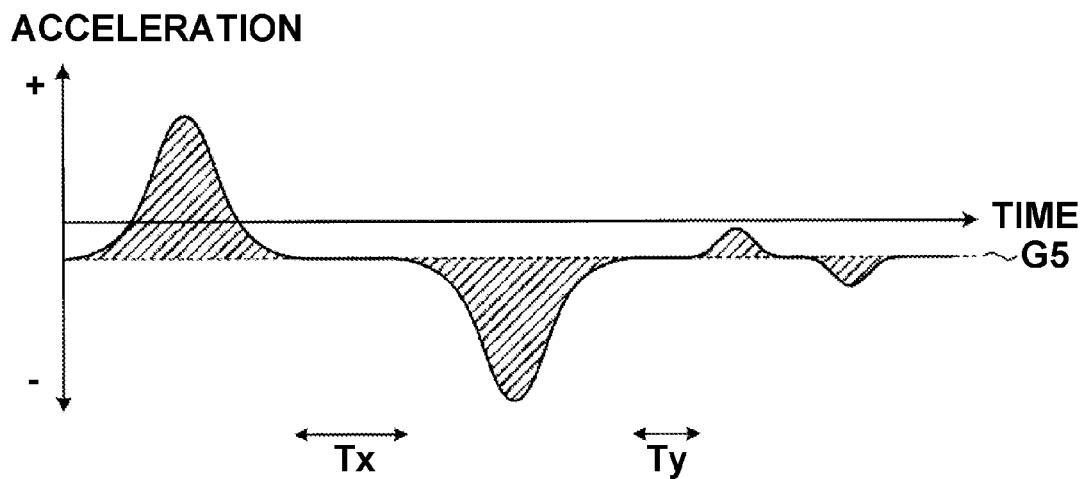

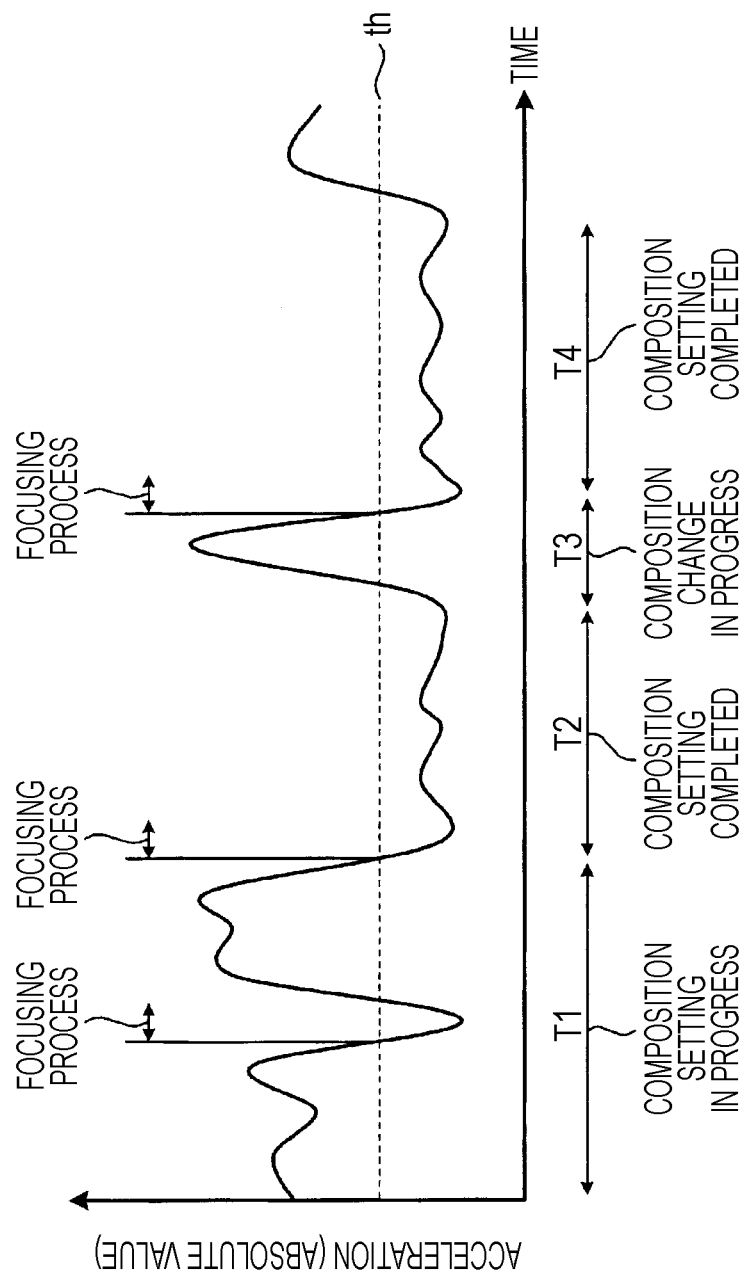

IMAGE PICKUP APPARATUS AND FOCUSING MECHANISM CONTROL METHOD

CROSS-REFERENCE TO RELATED APPLICATION

This application is based upon and claims the benefit of priority of the prior Japanese Patent Application No. 2009-031151, filed on Feb. 13, 2009, the entire contents of which are incorporated herein by reference.

FIELD

The embodiments discussed herein are related to an image pickup apparatus, and a focusing mechanism control method.

BACKGROUND

An image pickup apparatus such as a digital camera often has a focusing mechanism by which the image pickup apparatus is automatically focused on a target object. For a person who uses the image pickup apparatus, adjusting a focal position of a lens while checking with the naked eye whether the image pickup apparatus is clearly focused on a target object requires an advanced skill. Thus, the focusing mechanism automating the operation is now one of the important mechanisms for the image pickup apparatus.

The focusing mechanism, however, includes components which require electric power, such as various sensors and motors. Accordingly, in the case where the focusing mechanism is always performing a focusing process by which the image pickup apparatus is focused on a target object, the image pickup apparatus consumes higher amounts of power.

In view of the foregoing, Japanese Laid-open Patent Publication No. 2006-337689 discloses a technology in which movement of the image pickup apparatus is monitored using an acceleration sensor, and the focusing process is automatically started on the basis of changes in acceleration measured by the acceleration sensor. Specifically, in the technology, when a value of the measured acceleration changes from a value larger than a predetermined threshold value to a value smaller than the predetermined threshold value, the focusing process is automatically started, assuming that the operator is ready to take a shot.

In the related technology described above, however, the focusing process may be started ahead of the time when the focusing process is actually and appropriately performed. This problem is now described with reference to FIG. 13.

FIG. 13 illustrates, by way of example, changes in acceleration measured by an acceleration sensor included in an image pickup apparatus after the image pickup apparatus has been started. Referring to FIG. 13, the period T1 illustrates a period over which an operator is about to set a composition after starting the image pickup apparatus. The period T2 illustrates a period over which the operator is about to take a shot after setting the composition. The period T3 illustrates a period over which the operator is changing the composition after completing taking of a shot. The period T4 illustrates a period over which the operator is about to take a second shot after changing the composition.

As illustrated in the example of FIG. 13, within the period (T1) over which the operator is about to set a composition after starting the image pickup apparatus, and within the period (T3) over which the operator is changing the composition, the operator moves the image pickup apparatus significantly, causing high acceleration to be measured. On the other hand, within the period (T2, T4) over which the operator is about to take a shot, the operator keeps the image pickup apparatus at rest so that a shot image is not blurred, causing only low acceleration to be measured.

Therefore, when it is configured such that the focusing process is automatically started at the time when a value of acceleration changes from a value larger than a predetermined threshold value th to a value smaller than the threshold value th, the focusing process is appropriately started upon transition from T1 to T2 and transition from T3 to T4. Such a configuration in which the focusing process is automatically started at the time when the operation to take a shot is about to be performed, as described above, is advantageous in that it properly reflects the operator's intention.

The value of acceleration, however, may also change from a value larger than a threshold value to a value smaller than the threshold value while the operator is about to set a composition or change the composition. In the example illustrated in FIG. 13, the value of acceleration changes from a value larger than the threshold value th to a value smaller than the threshold value th within the period (T1) over which the operator is about to set a composition, causing the focusing process to be started. It is undesirable that the focusing process be performed before the operator sets or changes the composition as in the above-described case, because the focusing process is performed against the operator's intention. This causes the image pickup apparatus to waste electric power.

SUMMARY

According to an aspect of the invention, an image pickup apparatus comprising an imaging element for acquiring an image of a target object; a detector for detecting movement of the image pickup apparatus; and a controller for controlling focus of the imaging element on the target object while the movement of the image pickup apparatus detected by the detector is not more than a threshold degree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a focusing mechanism control method according to an embodiment of the present invention;

FIG. 2 is a block diagram illustrating a configuration of a mobile terminal device for performing the focusing mechanism control method according to the present embodiment;

FIG. 3 is a block diagram illustrating a configuration of the image processing circuit illustrated in FIG. 2;

FIG. 4 illustrates, by way of example, setting data stored in a nonvolatile memory;

FIG. 9 illustrates, by way of example, setting data using a plurality of threshold values;

FIG. 11 illustrates a process of automatically setting a threshold value;

FIG. 12 illustrates a composition setting detecting process in consideration of the influence of gravity; and FIG. 13 illustrates a related focusing mechanism control method.

DESCRIPTION OF EMBODIMENTS

Figure 5:
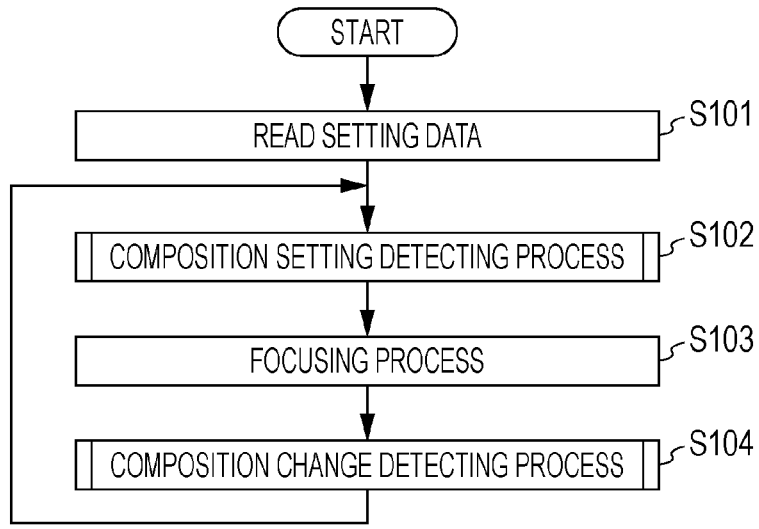
FIG. 5 is a flowchart illustrating a procedure of controlling a focusing mechanism performed by the image processing circuit.

Hereinafter, embodiments of the image pickup apparatus, the mobile terminal device, and the focusing mechanism control method disclosed in the present application is described in detail with reference to the drawings. It is noted that the present invention is not limited to the embodiments.

A focusing mechanism control method according to an embodiment is now described. In the focusing mechanism control method according to the present embodiment, a focusing process is automatically started when it is detected that setting of a composition has been completed. Starting the focusing process in response to detection of the completion of the composition setting in this manner, allows the focusing process to be started at an appropriate time in accordance with the operator's intention.

According to the focusing mechanism control method of the present embodiment, in the case where the condition in which an image pickup apparatus is virtually at rest continues for not less than a predetermined period, the completion of the composition setting is detected. In other words, the control of the focusing process is suspended while movement of the image pickup apparatus detected by a detecting means is in excess of a threshold degree. Whether the image pickup apparatus is virtually at rest can be determined on the basis of the acceleration measured by an acceleration sensor included in the image pickup apparatus or angular velocity measured by an angular velocity sensor included in the image pickup apparatus. Alternatively, two images which are consecutively acquired by the image pickup apparatus at a predetermined time interval can be matched with each other to make the determination on the basis of the amount of displacement between the images.

Further, according to the focusing mechanism control method of the present embodiment, in the case where the condition in which the image pickup apparatus is virtually at rest still continues after the focusing process has been completed, no focusing process is automatically started, even when the condition in which the image pickup apparatus is virtually at rest continues for not less than the predetermined period again. If the condition in which the image pickup apparatus is virtually at rest continues even after the focusing process has been completed, it is considered that the image pickup apparatus remains focused on the target object and, thus, it is unnecessary to repeat the focusing process.

Furthermore, according to the focusing mechanism control method of the present embodiment, in the case where movement of the image pickup apparatus of not less than a predetermined degree is detected after the focusing process has been completed, and subsequently the condition in which the image pickup apparatus is virtually at rest continues for not less than a predetermined period, then the focusing process is automatically started again. This is because, in this case, there is a high possibility that the composition has been changed and, hence, the target object or the distance between the target object and the image pickup apparatus has been changed, and it is thus appropriate to perform the focusing process again.

As described above, according to the focusing mechanism control method of the present embodiment, the focusing process can be performed at an appropriate time by detecting the completion of the composition setting or detecting a change of the composition. The detecting of the completion of the composition setting and the detecting of a change of the composition on the basis of the acceleration measured by the acceleration sensor included in the image pickup apparatus is now described.

FIG. 1 illustrates the focusing mechanism control method according to the present embodiment. FIG. 1 illustrates an example of changes in acceleration measured by the acceleration sensor included in the image pickup apparatus after the image pickup apparatus has been started, under the same condition as that in FIG. 13.

As illustrated in FIG. 1, according to the focusing mechanism control method of the present embodiment, in the case where the condition in which a value of acceleration measured by the acceleration sensor included in the image pickup apparatus is not more than a threshold value G1 continues for a predetermined period, completion of the composition setting is detected, and then, the focusing process is started. As a result, even when the acceleration is temporarily decreased within the period T1 over which the composition setting is being performed, for example, no focusing process is started.

It is preferable that the predetermined period stated above is long enough to prevent the completion of the composition setting from being falsely detected within the period over which the composition setting is being performed, and is short enough for an operator not to sense a time lag between the completion of the composition setting and the start of the focusing process.

Further, according to the focusing mechanism control method of the present embodiment, even when the condition in which the value of acceleration measured by the acceleration sensor included in the image pickup apparatus is not more than the threshold value G1 continues for the predetermined period after the focusing process has been completed, no focusing process is performed again. In the case where the condition in which the value of acceleration measured by the acceleration sensor included in the image pickup apparatus is not less than a threshold value G2 continues for the predetermined period, a change of the composition is detected. After that, in the case where the condition in which the value of acceleration is not more than the threshold value G1 continues for the predetermined period, the focusing process is performed again.

It is noted that the value of acceleration illustrated in FIG. 1 is an absolute value of magnitude of an acceleration vector acquired by the acceleration sensor. For example, in the case where the acceleration sensor is a three-axis acceleration sensor and measures three components Gx, Gy, Gz of the acceleration in the respective axial directions, the acceleration is calculated by the following expression.

$$\sqrt{(Gx^2+Gy^2+Gz^2)}$$

Further, the acceleration sensor actually detects an acceleration of 1G in the direction of gravity. For ease of explanation, however, it is assumed in the present application that the acceleration of 1G in the direction of gravity is eliminated from a result of measurement by a well-known technique, unless otherwise specified.

A configuration of an apparatus for performing the focusing mechanism control method according to the present embodiment is now described. FIG. 2 is a block diagram illustrating a configuration of a mobile terminal device 10 for performing the focusing mechanism control method according to the present embodiment. While the mobile terminal device is described here as an example of the apparatus for performing the focusing mechanism control method according to the present embodiment, the focusing mechanism control method according to the present embodiment may be performed by various types of apparatuses each having an image pickup function, such as a digital camera.

Referring to FIG. 2, the mobile terminal device 10 includes an imaging element 101, an image processing circuit 102, an acceleration sensor 103, a nonvolatile memory 104, a dynamic random access memory (DRAM) 105, a central processing unit (CPU) 106, a display portion 107, an input portion 108, a microphone 109, a speaker 110, a communication portion 111, and an antenna 112.

The imaging element 101 is a functional unit which acquires an image as an electrical signal, and includes a lens portion 101a, an image pickup portion 101b, and a focusing mechanism drive portion 101c. The lens portion 101a includes a lens for forming an image on an image pickup sensor included in the image pickup portion 101b, and a focusing mechanism which changes the relative distance between the lens and the image pickup sensor.

The image pickup portion 101b includes the image pickup sensor for converting light into an analog electrical signal, and an analog-to-digital converter for converting the analog electrical signal acquired by the image pickup sensor into a digital electrical signal. The focusing mechanism drive portion 101c drives the focusing mechanism included in the lens portion 101a, so as to change the relative distance between the lens included in the lens portion 101a and the image pickup sensor included in the image pickup portion 101b.

The image processing circuit 102 performs various processes on the digital electrical signal output from the image pickup portion 101b so as to generate image data. The image processing circuit 102 not only detects start timing of the focusing process on the basis of the acceleration acquired from the acceleration sensor 103, but also controls the focusing mechanism drive portion 101c on the basis of an image formed by the digital electrical signal output from the image pickup portion 101b for implementing the focusing process. The image processing circuit 102 is described later in detail.

The acceleration sensor 103 detects acceleration and informs the image processing circuit 102 of the detected acceleration. The nonvolatile memory 104 is a memory that continues to store information even when power is removed from the mobile terminal device 10, and stores various setting data used by the image processing circuit 102. The setting data stored in the nonvolatile memory 104 includes a threshold value or the like for use in detecting the completion of the composition setting or detecting a change of the composition.

The DRAM 105 temporarily stores information which the image processing circuit 102 uses for various processes. The nonvolatile memory 104 and the DRAM 105 may be configured to store not only the information used by the image processing circuit 102, but also information used by the CPU 106.

The CPU 106 is a control unit which is responsible for overall control of the mobile terminal device 10. For example, the CPU 106 carries out control for execution of a process in which image data generated by the image processing circuit 102 is written into an external memory card (not illustrated in the figure) or transmitted to other devices via the communication portion 111.

The display portion 107 includes a display device such as a liquid crystal display (LCD), and displays various kinds of information which are appropriate for a user to operate the mobile terminal device 10. During the time when the user is using the mobile terminal device 10 as an image pickup apparatus, the display portion 107 displays the image data generated by the image processing circuit 102 one after another, and so as to provide the user with information which is appropriate to set the composition.

The input portion 108 includes various buttons or the like for accepting operations from a user. During the time when the user is using the mobile terminal device 10 as the image pickup apparatus, the input portion 108 accepts an operation such as a shutter release from the user.

The microphone 109 and the speaker 110 are primarily used for radio communication. The communication portion 111 is a functional unit which implements the radio communication. The antenna 112 transmits and receives radio waves for the radio communication.

FIG. 3 is a block diagram illustrating a configuration of the image processing circuit 102 illustrated in FIG. 2. As illustrated in FIG. 3, the image processing circuit 102 has a detector 102a and a controller 102d. It is noted that FIG. 3 illustrates only the configuration associated with the focusing mechanism control method according to the present embodiment.

The detector 102a detects that setting of a composition has been completed or detects that the composition has been changed, on the basis of the acceleration measured by the acceleration sensor 103 and the setting data stored in the nonvolatile memory 104.

The detector 102a includes a composition setting detector 102b and a composition change detector 102c. The composition setting detector 102b detects the completion of the composition setting on the basis of the acceleration measured by the acceleration sensor 103 and setting data for use in determining whether the image pickup apparatus is at rest, which is stored in the nonvolatile memory 104. The composition change detector 102c detects a change of the composition on the basis of the acceleration measured by the acceleration sensor 103 and setting data for use in determining whether the image pickup apparatus is in motion, which is stored in the nonvolatile memory 104.

FIG. 4 illustrates setting data stored in the nonvolatile memory 104 by way of example. In the example of FIG. 4, the setting data for the "at-rest determination" indicates that the completion of the composition setting is detected when the condition in which the value of the acceleration is not more than G1 is detected C1 or more times in succession. Further, in the example of FIG. 4, the setting data for the "in-motion determination" indicates that a change of the composition is detected when the condition in which the value of acceleration is not less than G2 is detected C2 or more times in succession.

Once the composition setting detector 102b detects the completion of the composition setting, the detector 102a prevents the composition setting detector 102b from detecting the completion of the composition setting again, until the composition change detector 102c detects a change of the composition.

When the detector 102a detects the completion of the composition setting, the controller 102d performs the focusing process. Specifically, while detecting a displacement between a focal position of a lens and a position of a target object on the basis of an image formed by a digital electrical signal output from the image pickup portion 101b, the controller 102d adjusts a controlled variable to be applied to the focusing mechanism drive portion 101c until the displacement is eliminated.

A procedure of controlling the focusing mechanism performed by the image processing circuit 102 illustrated in FIG.

3 is now described. FIG. 5 is a flowchart illustrating the procedure of controlling the focusing mechanism performed by the image processing circuit 102. Referring to FIG. 5, when the image pickup function included in the mobile terminal device 10 is enabled, the detector 102a reads the setting data illustrated in FIG. 4 from the nonvolatile memory 104 (step S101).

Then, the composition setting detector 102b performs a composition setting detecting process which is described below, until the completion of the composition setting is detected (step S102). When the completion of the composition setting is detected, the controller 102d performs the focusing process (step S103). The composition change detector 102c then performs a composition change detecting process which is described later, until a change of the composition is detected (step S104). Thereafter, the steps S102 to S104 are repeated.

Figure 6:
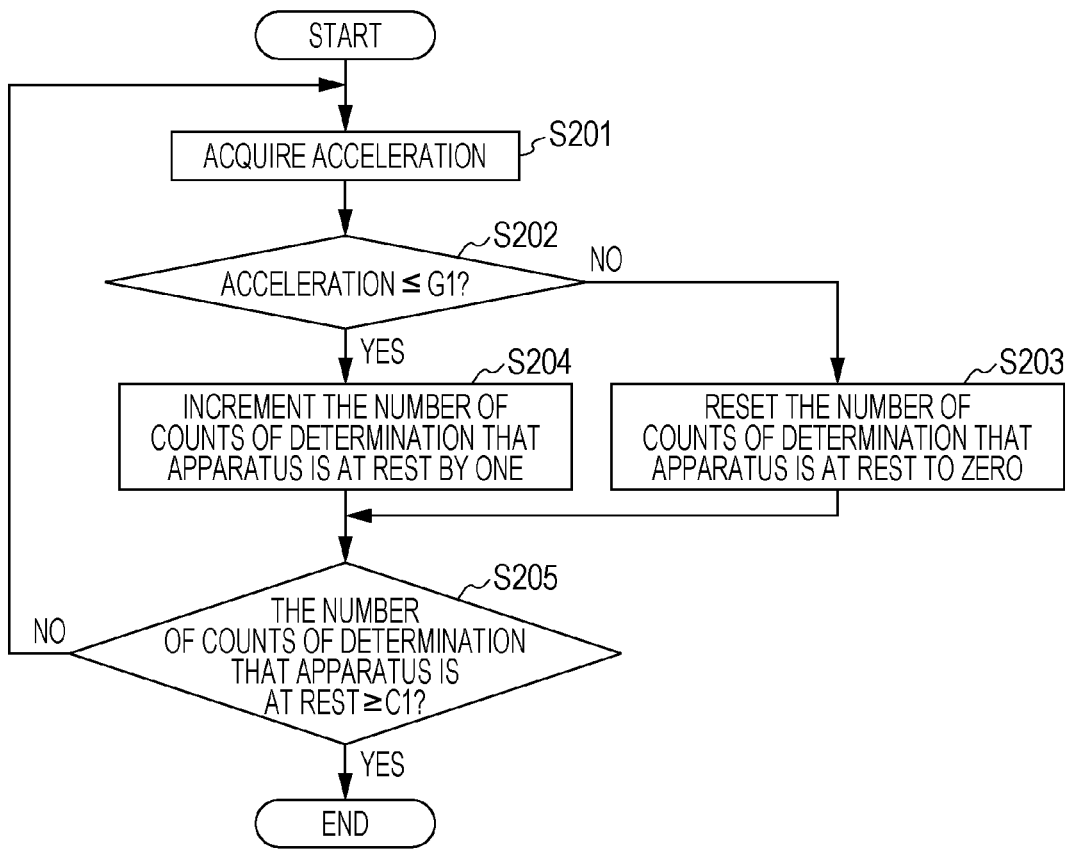
FIG. 6 is a flowchart illustrating a procedure of the composition setting detecting process illustrated in FIG. 5.

FIG. 6 is a flowchart illustrating a procedure of the composition setting detecting process illustrated in FIG. 5. Referring to FIG. 6, the composition setting detector 102b acquires acceleration from the acceleration sensor 103 (step S201). If the value of the acceleration exceeds a threshold value G1 (No in step S202), the composition setting detector 102b resets to zero the number of counts of determination that the apparatus is at rest, which is stored in the DRAM 105 (step S203). On the other hand, if the value of the acceleration is not more than the threshold value G1 (Yes in step S202), the composition setting detector 102b increments by one the number of counts of determination that the apparatus is at rest, which is stored in the DRAM 105 (step S204).

After manipulating the number of counts of determination that the apparatus is at rest as described above, the composition setting detector 102b checks whether the number of counts of determination that the apparatus is at rest, which is stored in the DRAM 105, is not less than C1. If the number of counts of determination that the apparatus is at rest is not less than C1 (Yes in step S205), this means that the completion of the composition setting is detected, and accordingly, the composition setting detector 102b terminates the composition setting detecting process. On the other hand, if the number of counts of determination that the apparatus is at rest is less than C1 (No in step S205), the composition setting detector 102b resumes the procedure from step S201.

Figure 7:
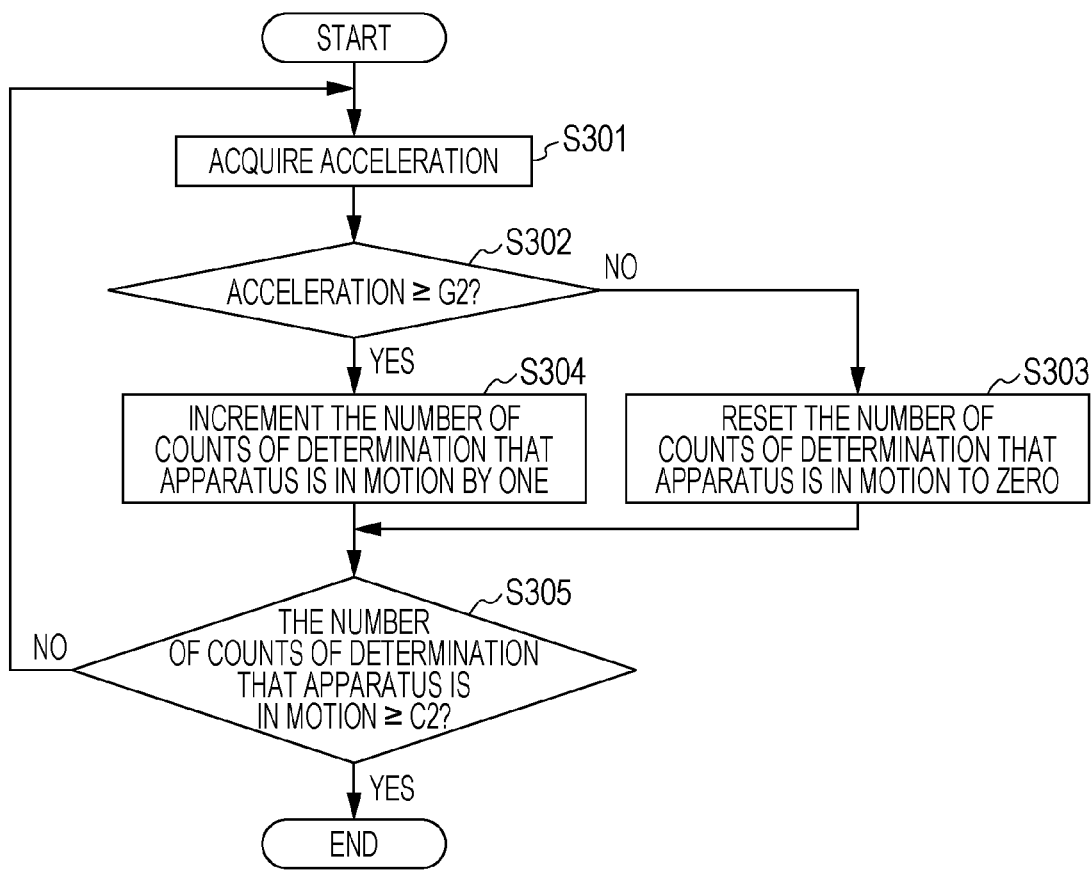
FIG. 7 is a flowchart illustrating a procedure of the composition change detecting process illustrated in FIG. 5.

FIG. 7 is a flowchart illustrating a procedure of the composition change detecting process illustrated in FIG. 5. Referring to FIG. 7, the composition change detector 102c acquires acceleration from the acceleration sensor 103 (step S301). If the value of the acceleration falls below a threshold value G2 (No in step S302), the composition change detector 102c resets to zero the number of counts of determination that the apparatus is in motion, which is stored in the DRAM 105 (step S303). On the other hand, if the value of the acceleration is not less than the threshold value G2 (Yes in step S302), the composition change detector 102c increments by one the number of counts of determination that the apparatus is in motion, which is stored in the DRAM 105 (step S304).

After manipulating the number of counts of determination that the apparatus is in motion as described above, the composition change detector 102c checks whether the number of counts of determination that the apparatus is in motion, which is stored in the DRAM 105, is not less than C2. If the number of counts of determination that the apparatus is in motion is not less than C2 (Yes in step S305), this means that a change of the composition is detected, and accordingly, the composition change detector 102c terminates the composition change detecting process. On the other hand, if the number of counts of determination that the apparatus is in motion is less than C2 (No in step S305), the composition change detector 102c resumes the procedure from step S301.

As described above, according to the present embodiment, in the case where the condition in which the image pickup apparatus is virtually at rest continues for not less than the predetermined period, the completion of the composition setting is detected, and correspondingly, the focusing process is started. This allows the focusing process to be started at the right times. In the present embodiment, once the focusing process has been completed, the focusing process is not performed again until a change of the composition is detected. This prevents the focusing process from being performed needlessly even in the case where the condition in which the image pickup apparatus is virtually at rest continues for a long period.

Figure 8:
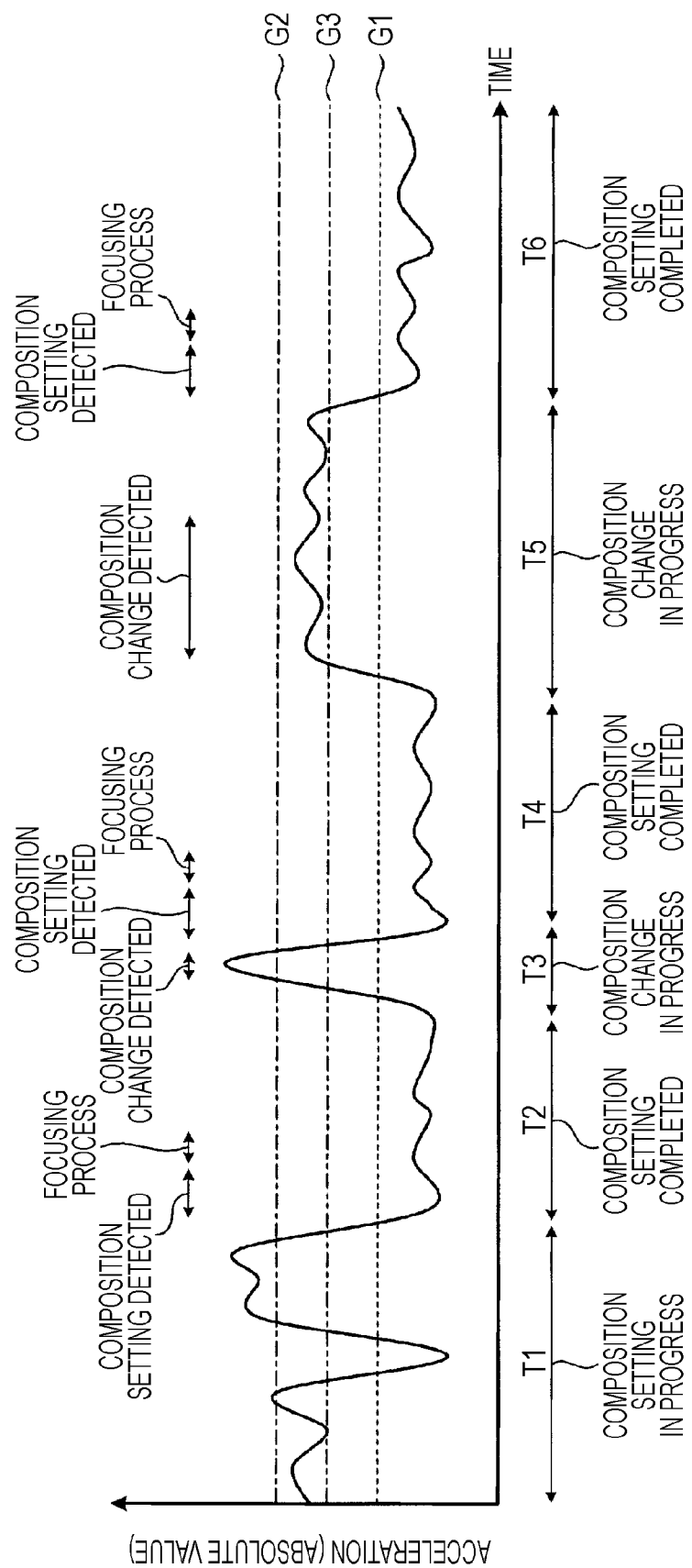
FIG. 8 illustrates a focusing mechanism control method using a plurality of threshold values.

While one threshold value is used in order to detect a change of the composition in the embodiment described above, a plurality of threshold values may be used to detect a change of the composition. Using a plurality of threshold values to detect a change of the composition is now described with reference to FIG. 8. FIG. 8 illustrates an example of changes in acceleration measured by the acceleration sensor included in the image pickup apparatus after the image pickup apparatus has been started, under the same condition as FIG. 1 and the subsequent conditions.

In the example illustrated in FIG. 8, the period T4 is followed by a period T5 over which an operator is changing the composition and a period T6 over which the operator is about to take a third shot after changing the composition. In the period T5, a change of the composition is performed while the image pickup apparatus is being moved relatively slowly, causing acceleration measured by the acceleration sensor to fall below the threshold value G2. Under this condition, a change of the composition is not detected.

In the example illustrated in FIG. 8, a threshold value G3 lower than the threshold value G2 is set so as to allow detection of even a change of the composition which is performed while the image pickup apparatus is being moved relatively slowly. As a lower threshold value is additionally set as described above, a change of the composition can be detected even in the case where the measured acceleration is relatively low. However, the image pickup apparatus may be slightly moved for the purpose of fine adjustment of the composition or the like, even within the period over which the operator is about to take a shot after setting the composition. In such cases, when a lower threshold value is set, it is highly possible that such a slight movement of the image pickup apparatus is falsely detected as a change of the composition.

Accordingly, in the example illustrated in FIG. 8, the period which is appropriate to detect a change of the composition on the basis of the threshold value G3 is set to be longer than the corresponding period for the threshold value G2. The period over which the value of the acceleration measured appropriately keep a level of not less than the threshold value G3 can be set longer in this manner, to prevent a change of the composition from being falsely detected by acceleration temporarily detected due to the fine adjustment of the composition or the like.

FIG. 9 illustrates an example of setting data stored in the nonvolatile memory 104 when the threshold value G3 is set. Referring to FIG. 9, the setting data of the "in-motion determination A" type is identical to the setting data of the "in-motion determination" type illustrated in FIG. 4. In FIG. 9, however, the setting data of the "in-motion determination B" type has been added in accordance with the setting of the threshold value G3.

In the setting data of the "in-motion determination B" type, the threshold value G3 is set to be lower than the threshold value G2 which has been set for the "in-motion determination" type. Further, the number of counts C3, which is the number of times that the acceleration of the value not less than the threshold value is detected in succession, is set to be more than the number of counts C2 which has been set for the setting data of the "in-motion determination" type.

Figure 10:
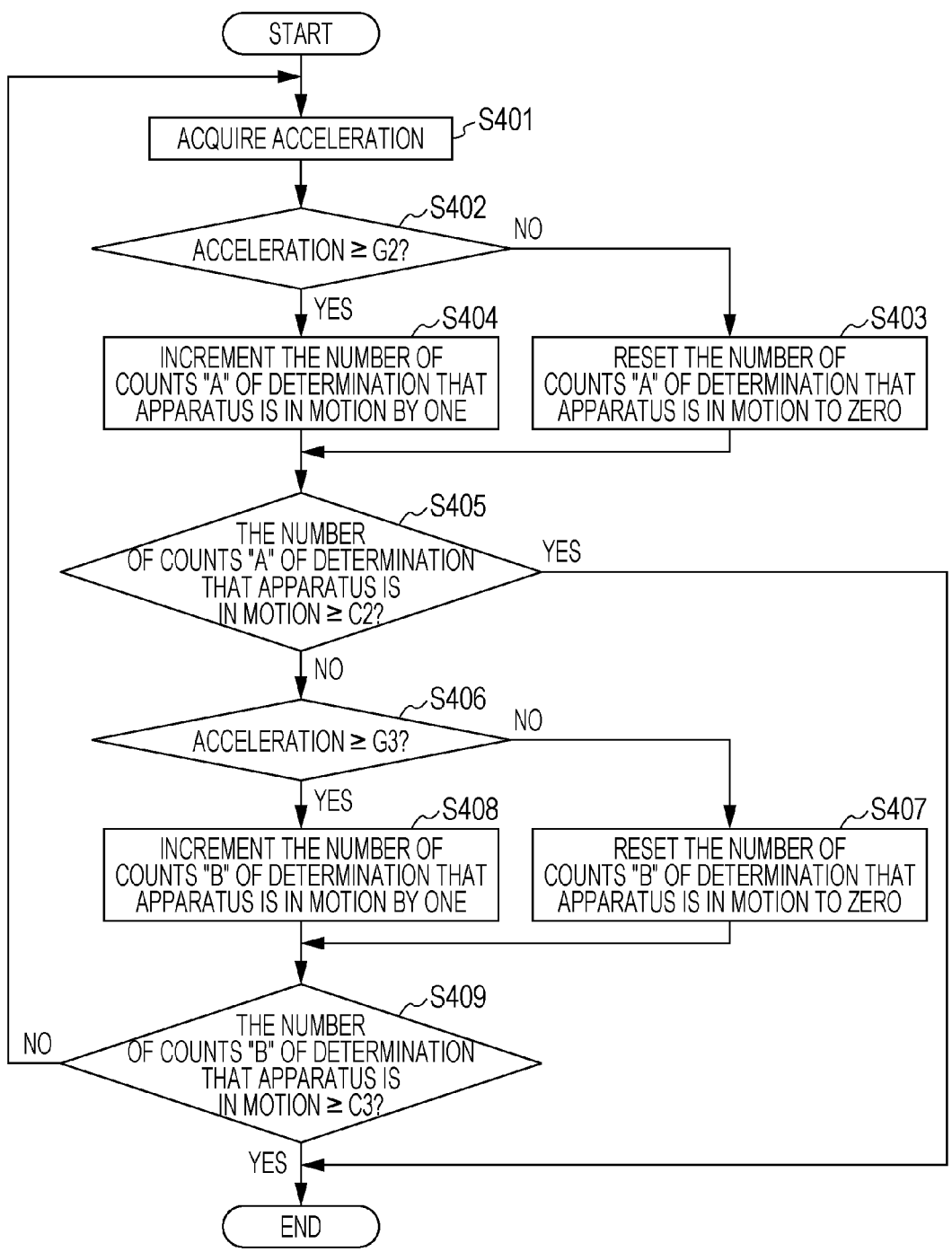
FIG. 10 is a flowchart illustrating a procedure of a composition change detecting process using a plurality of threshold values.

FIG. 10 is a flowchart illustrating a procedure of a composition change detecting process which is performed when the threshold value G3 is added as illustrated in FIG. 8. When the threshold value G3 is added as illustrated in FIG. 8, the composition change detector 102c performs this procedure, instead of the procedure illustrated in FIG. 7.

Referring to FIG. 10, the composition change detector 102c acquires an acceleration value from the acceleration sensor 103 (step S401). If the value of the acceleration falls below the threshold value G2 (No in step S402), the composition change detector 102c resets to zero the number of counts A of determination that the apparatus is in motion, which is stored in the DRAM 105 (step S403). On the other hand, if the value of the acceleration is not less than the threshold value G2 (Yes in step S402), the composition change detector 102c increments by one the number of counts A of determination that the apparatus is in motion, which is stored in the DRAM 105 (step S404).

After manipulating the number of counts A of determination that the apparatus is in motion as described above, the composition change detector 102c checks whether the number of counts of determination that the apparatus is in motion, which is stored in the DRAM 105, is not less than C2. If the number of counts A of determination that the apparatus is in motion is not less than C2 (Yes in step S405), this means that a change of the composition is detected, and accordingly, the composition change detector 102c terminates the composition change detecting process.

On the other hand, if the number of counts A of determination that the apparatus is in motion is less than C2 (No in step S405), the composition change detector 102c compares the value of acceleration with the threshold value G3. If the value of the acceleration falls below the threshold value G3 (No in step S406), the composition change detector 102c resets to zero the number of counts B of determination that the apparatus is in motion, which is stored in the DRAM 105 (step S407). On the other hand, if the value of the acceleration is not less than the threshold value G3 (Yes in step S406), the composition change detector 102c increments by one the number of counts B of determination that the apparatus is in motion, which is stored in the DRAM 105 (step S408).

After manipulating the number of counts B of determination that the apparatus is in motion as described above, the composition change detector 102c checks whether the number of counts B of determination that the apparatus is in motion, which is stored in the DRAM 105, is not less than C3. If the number of counts B of determination that the apparatus is in motion is not less than C3 (Yes in step S409), this means that a change of the composition is detected, and accordingly, the composition change detector 102c terminates the composition change detecting process. On the other hand, if the number of counts B of determination that the apparatus is at rest is less than C3 (No in step S409), the composition change detector 102c resumes the procedure from step S401.

Each of the threshold values illustrated in the embodiments described above may be also set automatically in accordance with properties of an operator. Specifically, each of the threshold values can be optimized in accordance with properties of an operator by setting the threshold values on the basis of the acceleration measured within a predetermined period before and after a shutter release. Before and after the shutter release, the operator tries to keep the image pickup apparatus at rest as much as possible so that a shot image is not blurred. Thus, the acceleration measured within this period can be used to determine how stably the operator can keep the image pickup apparatus at rest.

For example, in the case where high acceleration is measured within the predetermined period before and after the shutter release, it is presumed that the operator is weak in keeping the image pickup apparatus at rest. For such an operator, the completion of the composition setting may not be successfully detected if the threshold values are set as usual. Accordingly, as each of the threshold values is set to be higher than usual in accordance with the value of acceleration measured within the predetermined period before and after the shutter release, the completion of the composition setting can be detected more successfully.

A process of automatically setting the threshold value is now described with reference to FIG. 11. In the example illustrated in FIG. 11, a maximum value G4 of the acceleration is acquired from the values of the acceleration measured within a predetermined period Tb before a shutter release and a period Ta after the shutter release. The G4 acquired above can be multiplied by a coefficient which is set in advance for each threshold value, to automatically determine each optimum threshold value. While the maximum value of acceleration within the predetermined period before and after the shutter release is acquired here, an average value or the like may be acquired.

Further, while the completion of the composition setting or the like is detected on the basis of the absolute value of magnitude of the acceleration vector acquired by the acceleration sensor in the embodiment described above, the completion of the composition setting or the like may be detected by monitoring the magnitude of the acceleration in each of a plurality of axial directions.

For the three-axis acceleration sensor, for example, it may be configured such that the respective values of acceleration in the x-axis direction, the y-axis direction, and the z-axis direction are compared with the threshold value G1 illustrated in FIG. 1, and that the completion of the composition setting is detected if the condition in which the values of acceleration in all the axial directions are not more than the threshold value G1 continues for not less than the predetermined period.

The influence of gravity is removed from the acceleration measured by the acceleration sensor in the embodiment described above. So as to remove the influence of gravity, for example, a difference between the value of acceleration currently measured in each axial direction and the value of acceleration previously measured in the corresponding axial direction may be determined. In this case, the difference between the values of the acceleration is compared with the threshold value to detect the completion of the composition setting or the like.

It is noted that, in the case where the completion of the composition setting or the like is to be detected on the basis of the difference as described above, the completion of the composition setting may be falsely detected even when the image pickup apparatus is moving, because the difference between values of acceleration becomes zero while the image pickup apparatus is moving in a certain direction and at a constant speed.

A method to prevent such a false detection is now described with reference to FIG. 12. Assuming that the influence of gravity has not been removed and the image pickup apparatus is moving in a certain direction, the value of acceleration measured by the acceleration sensor in each axial direction includes a constant gravity component. Here, assume that a value of acceleration measured in a predetermined axial direction includes the gravity component having a magnitude of G5 in a minus direction.

In this condition, if the integral of acceleration in the plus direction with respect to G5 approximately matches the integral of acceleration in the minus direction with respect to G5, and if the measured acceleration is nearly constantly held at G5, then it can be determined that the image pickup apparatus is at rest in that axial direction. For example, in FIG. 12, it can be determined that, while the image pickup apparatus is not at rest in the period Tx, the image pickup apparatus is at rest in that axial direction in the period Ty.

Furthermore, while the image processing circuit 102 performs the focusing mechanism control method according to the present embodiment in the embodiment described above, the CPU 106 may perform the focusing mechanism control method according to the present embodiment. In this case, a program for performing the focusing mechanism control method according to the present embodiment may be stored in a predetermined storage portion. The CPU 106 may load a sequence of instructions included in the program into the DRAM 105 or the like from which the CPU 106 in turn performs them one after another.

According to embodiments of the image pickup apparatus, the mobile terminal device, and the focusing mechanism control method disclosed in the present application, the focusing process can be automatically started at the right times.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image pickup apparatus comprising:
    an imaging element configured to acquire an image of target object;
    a sensor configured to detect a degree of movement of the image pickup apparatus; and
    a processor configured to:
    determine the degree is not more than a threshold degree;
    check the degree is not more than the threshold degree during a period of time after it is determined that the degree is not more than the threshold degree; and
    control a focus of the imaging element after an end of the period of time when the degree is not more than the threshold degree during the period of time.

2. The image pickup apparatus according to claim 1, wherein the processor is configured to stop the controlling until the sensor detects that the degree is not less than another threshold degree for another period, when the focus is completed.

3. The image pickup apparatus according to claim 2, wherein the processor is configured to restart controlling the focus on the case of the sensor detects that the degree remains not less than the another threshold degree for the another period, or the degree is not less than a third threshold degree, which is smaller than the another threshold degree, for a third period, which is longer than the another period.

4. The image pickup apparatus according to claim 1, wherein the processor is configured to measure the degree of the movement after it is determined that the degree is not more than the threshold degree.

5. The image pickup apparatus according to claim 4, wherein the threshold degree is determined based on the measured degree when the imaging element acquires the image of the target object.

6. The image pickup apparatus according to claim 1, wherein the degree includes acceleration.

7. The image pickup apparatus according to claim 1, wherein the image pickup apparatus is a mobile terminal device including a communication portion for communicating with a communicating device.

8. A focusing mechanism control method comprising:
    detecting a degree of movement of an imaging element;
    determining the degree is not more than a threshold degree;
    checking the degree is not more than the threshold degree during a period of time after it is determined that the degree is not more than the threshold degree; and
    by a processor, controlling a focus of the imaging element after an end of the period of time when the degree is not more than the threshold degree during the period of time.

9. A image processing circuit for being incorporated in an image pickup apparatus, the image processing circuit comprising:
    a detection circuit configured to detect a degree of movement of the image pickup apparatus;
    a determine circuit configured to determine the degree is not more than a threshold degree;
    a check circuit configured to check the degree is not more than the threshold degree during a period of time after it is determined that the degree is not more than the threshold degree; and
    a control circuit configured to control a focus of the imaging element after an end of the period of time when the degree is not more than the threshold degree during the period of time.

10. The focusing mechanism control method according to claim 8 comprising:
    stopping the controlling until the degree is not less than another threshold degree for another period, when the focus is completed.

11. The focusing mechanism control method according to claim 10 comprising:
    restarting controlling the focus on the case of the sensor detects that the degree remains not less than the another threshold degree for the another period, or the degree is not less than a third threshold degree, which is smaller than the another threshold degree, for a third period, which is longer than the another period.

12. The focusing mechanism control method according to claim 8 comprising:
    measuring the degree of the movement after it is determined that the degree is not more than the threshold degree.

13. The focusing mechanism control method according to claim 12, wherein the threshold degree is determined based on the measured degree when an image of a target object is acquired.

14. The focusing mechanism control method according to claim 8, wherein the degree includes acceleration.

15. The focusing mechanism control method according to claim 8, wherein the focusing mechanism control method is applied to an image pickup apparatus is a mobile terminal device including a communication portion for communicating with a communicating device.

16. The image processing circuit according to claim 9, the control circuit is configured to stop the controlling until the sensor detects that the degree is not less than another threshold degree for another period, when the focus is completed.

17. The image processing circuit according to claim 16, wherein the control circuit is configured to restart controlling the focus on the case of the sensor detects that the degree remains not less than the another threshold degree for the another period, or the degree is not less than a third threshold degree, which is smaller than the another threshold degree, for a third period, which is longer than the another period.

18. The image processing circuit according to claim 9 comprising: a measure circuit configured to measure the degree of the movement after it is determined that the degree is not more than the threshold degree.

19. The image processing circuit according to claim 18 comprising: wherein the threshold degree is determined based on the measured degree when an image of a target object is acquired.

20. The image processing circuit according to claim 9, wherein the degree includes acceleration.

21. The image pickup apparatus according to claim 1, wherein the period of time is a period of time for determining whether the movement continues at substantially rest.

22. The image pickup apparatus according to claim 1, wherein the processor is configured to check the degree is not more than the threshold degree during the period of time by counting a number of conditions that the degree is not more than the threshold degree during the period of time.

23. The image pickup apparatus according to claim 1, wherein the processor is configured to check the degree is not more than the threshold degree for the period of time by repeatedly checking the degree is not more than the threshold degree during the period of time.

24. The focusing mechanism control method according to claim 8, wherein the period of time is a period of time for determining whether the movement continues at substantially rest.

25. The focusing mechanism control method according to claim 8, wherein the checking includes counting a number of conditions that the degree is not more than the threshold degree during the period of time.

26. The focusing mechanism control method according to claim 8, wherein the checking includes repeatedly checking the degree is not more than the threshold degree during the period of time.

27. The image pickup apparatus according to claim 9, wherein the period of time is a period of time for determining whether the movement continues at substantially rest.

28. The image pickup apparatus according to claim 9, wherein the check circuit is configured to check the degree is not more than the threshold degree during the period of time by counting a number of conditions that the degree is not more than the threshold degree during the period of time.

29. The image pickup apparatus according to claim 9, wherein the check circuit is configured to check the degree is not more than the threshold degree during the period of time by repeatedly checking the degree is not more than the threshold degree during the period of time.

\* \* \* \* \*